(12) United States Patent
Formato et al.

(10) Patent No.: US 7,113,360 B2
(45) Date of Patent: Sep. 26, 2006

(54) MANUFACTURE OF CONCENTRIC PATTERNS FROM SPIRAL SOURCE

(75) Inventors: Christopher J. Formato, Brentwood, CA (US); Neil N. Deeman, Alamo, CA (US)

(73) Assignee: Seagate Technology LLC, Scotts Valley, CA (US)

(*) Notice: Subject to any disclaimer, the term of this patent is extended or adjusted under 35 U.S.C. 154(b) by 435 days.

(21) Appl. No.: 10/607,311

(22) Filed: Jun. 27, 2003

(65) Prior Publication Data
US 2004/0001415 A1     Jan. 1, 2004

Related U.S. Application Data

(60) Provisional application No. 60/392,828, filed on Jun. 28, 2002.

(51) Int. Cl.
*G11B 21/02* (2006.01)
(52) U.S. Cl. ....................................... 360/75
(58) Field of Classification Search .............. 360/75, 360/17, 131; 369/44, 35, 47, 49, 121, 100, 369/44.13, 47.47, 275.4, 275.3; 386/88
See application file for complete search history.

(56) References Cited

U.S. PATENT DOCUMENTS

| 4,236,050 | A | * | 11/1980 | Winslow et al. ......... 369/47.47 |
| 4,353,089 | A | * | 10/1982 | Winslow et al. ............... 386/88 |
| 4,961,123 | A | * | 10/1990 | Williams et al. ............. 360/131 |
| 5,120,927 | A | * | 6/1992 | Williams et al. ........ 219/121.68 |
| 5,130,970 | A | * | 7/1992 | Ohta ........................... 369/100 |
| 5,170,382 | A |   | 12/1992 | Yamada et al. |
| 5,279,775 | A | * | 1/1994 | Thomas et al. ............. 264/1.33 |
| 5,689,485 | A | * | 11/1997 | Ceshkovsky .............. 369/44.13 |
| 5,796,711 | A | * | 8/1998 | Tomita et al. ............ 369/275.4 |
| 5,815,485 | A | * | 9/1998 | Tanaka et al. ........... 369/275.3 |
| 5,986,997 | A | * | 11/1999 | Challener, IV .............. 369/121 |
| 6,134,199 | A | * | 10/2000 | Ceshkovsky .............. 369/44.35 |
| 6,314,069 | B1 | * | 11/2001 | Ceshkovsky .............. 369/44.35 |
| 6,850,377 | B1 | * | 2/2005 | Hashi et al. ................... 360/17 |
| 2002/0186632 | A1 | * | 12/2002 | Kumasaka et al. ...... 369/47.49 |

OTHER PUBLICATIONS

Co-pending U.S. Appl. No. 10/449,727, filed Jun. 2, 2004, Deerman et al.

* cited by examiner

*Primary Examiner*—Fred F. Tzeng
(74) *Attorney, Agent, or Firm*—McDermott Will & Emery LLP

(57) ABSTRACT

The manufacture of magnetic disks for disk drives requires formation or servo tracks in a concentric pattern on the disk. Certain types of beam apparatuses for forming feature patterns on a disk shaped substrate, such as might be used in hard disk manufacture, however, provide spiral patterns. A ramp type deflection signal therefore is used to deflect the beam so as to form one circular pattern during each rotational cycle, and thereby convert the spiral pattern to a pattern comprising a series of circles.

11 Claims, 9 Drawing Sheets

Triggered by Index

Modulation

Index

Deflection

|← 1 Revolution →|

Triggered by Index

Modulation

Sector

Index

Deflection

Ramp Trigger Point

Ramp Trigger Point

Ramp Trigger Point

Modulation

Deflection

Pulse

Index

Ramp Trigger Point

Modulation

Deflection

Pulse

Index

Ramp Trigger Point

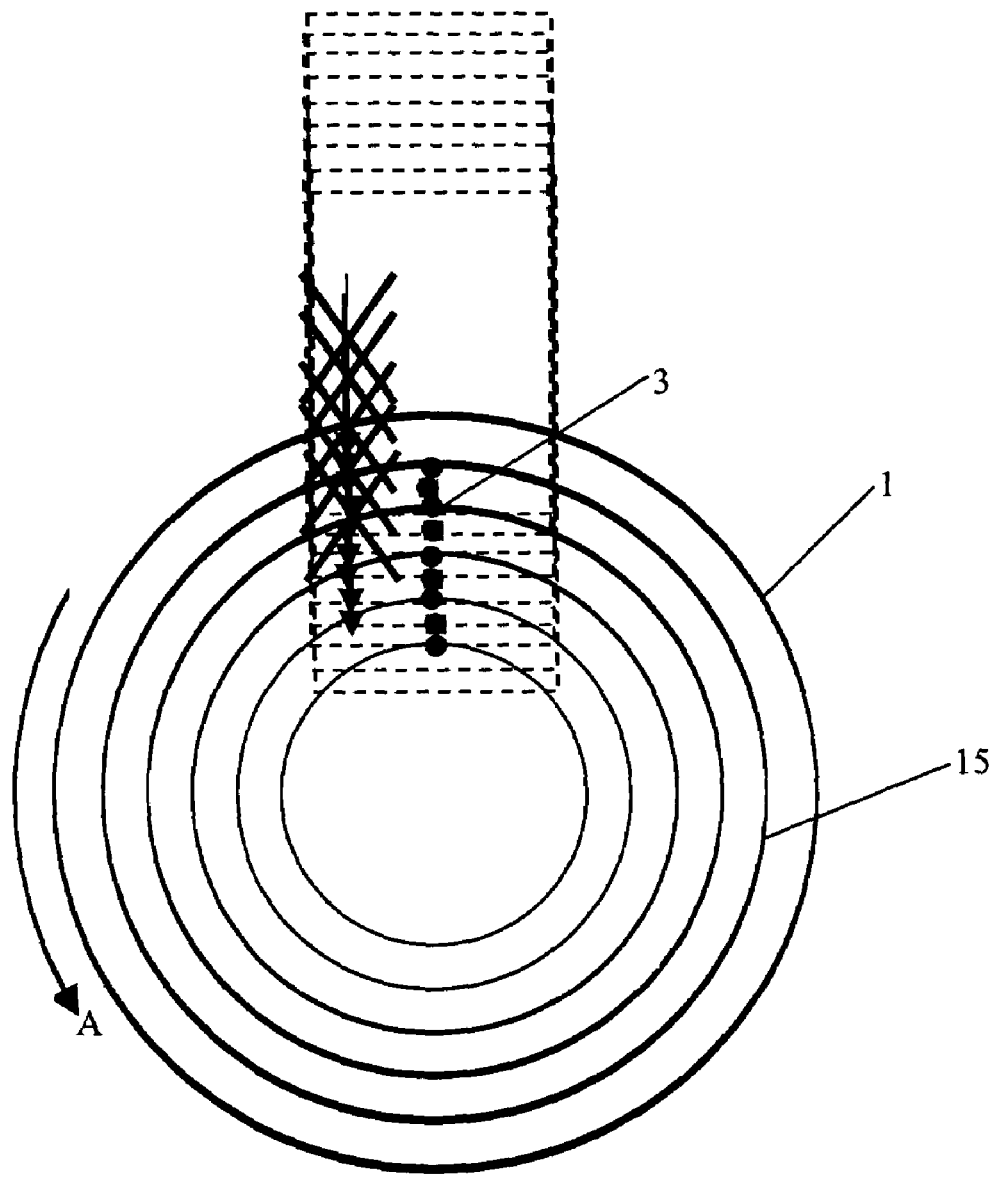
*Fig. 10 - Prior Art*

*Fig. 11 - Prior Art*
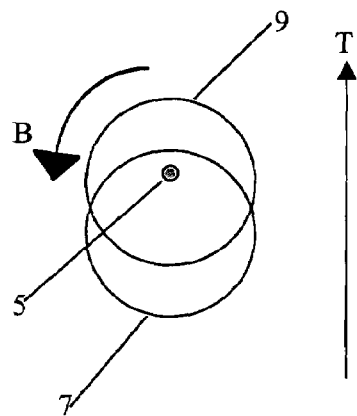
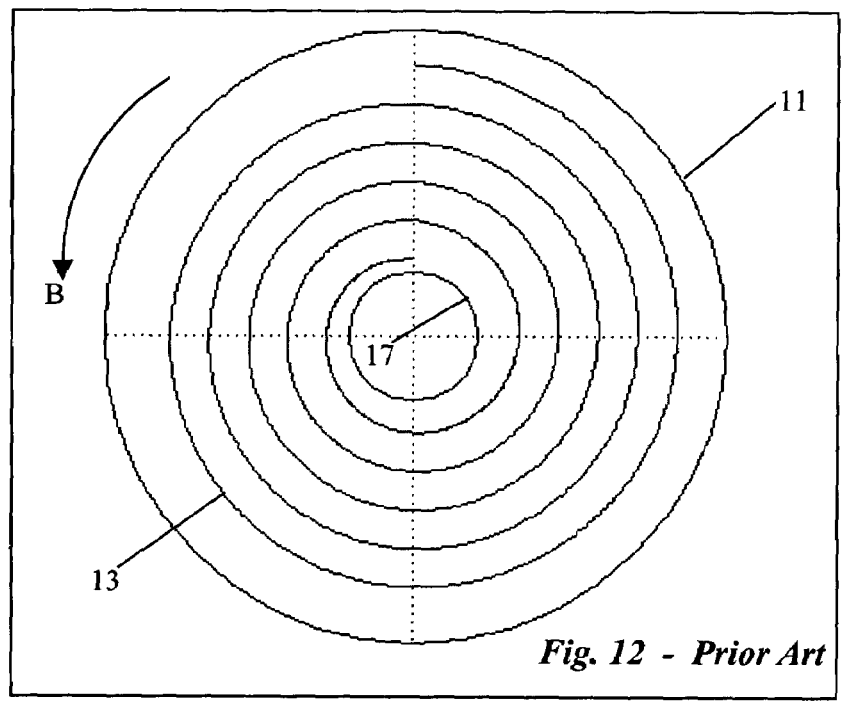
*Fig. 12 - Prior Art*

MANUFACTURE OF CONCENTRIC PATTERNS FROM SPIRAL SOURCE

RELATED APPLICATION

This application claims the benefit of U.S. Provisional Application No. 60/392,828 entitled "Manufacture of Concentric Patterns from Spiral Source" filed on Jun. 28, 2002, the disclosure of which is entirely incorporated herein by reference.

FIELD OF THE INVENTION

The present subject matter relates to techniques and equipment for laying down concentric patterns, for example, for tracks of servo patterns to be formed on a surface of the magnetic disk of a hard disk drive, using an electron beam recorder or other device that otherwise would produce spiral patterns.

BACKGROUND OF THE INVENTION

A magnetic disk drive, such as a hard disk drive, stores data on one or more disks coated with a magnetic medium. For read/write purposes, the surface of the magnetic medium carries a number of generally parallel data tracks, which on a disk type medium, are arranged concentrically with one another about the center of the disk.

An actuator arm positions a transducer or "head" over a desired track, and the head writes data to the track or reads data from the track. As the disk rotates, the actuator arm moves the head in a radial direction across the data tracks under control of a closed-loop servo system, based on position information or "servo data", which is stored within dedicated servo fields of the magnetic medium of the disk. The servo fields can be interleaved with data sectors on the disk surface or can be located on a separate disk surface that is dedicated to storing servo information. As the head passes over the servo fields, it generates a readback signal that identifies the location of the head relative to the center line of the desired track. Based on this location, the servo system moves the actuator arm to adjust the head's position so that it moves toward a position over the desired track and/or a desired location within the track of current interest.

One requirement in the manufacture of such a hard disk drive relates to the formation of the servo patterns on the magnetic disk, which must be in concentric circular patterns. Systems for forming the servo tracks on magnetic disks have used both stepped translation mechanisms with laser beams and continuous translation mechanisms with electron beams.

FIG. 10 is a simplified diagram useful in explaining a prior technique for forming the concentric servo track patterns, using a rotating turntable and a beam jogging mechanism. During processing, the disk 1 rests on a turntable (not separately visible in the illustrated orientation) that rotates about the axis of the turntable and the disk but is otherwise stationary. The stationary turntable rotates continuously in the direction of arrow A, thereby rotating the disk under movable laser beam, represented by the circular spots 3. The translational position of the beam along the disk radius remains stationary, for one rotation while a circular exposure is made. The beam may be modulated during the exposure cycle. As a result, the beam forms servo signals along one of the circular tracks 15 (represented by solid lines), as the disk rotates through one revolution. Then the beam is turned off (as represented by the intermediate square spots between track circles), and during the next disk rotation, the translation mechanism jogs the laser beam to the position for the next track. This process, of applying the beam to form servo signals on one track during one rotation, and then jogging the beam to its next position while the beam is off during the subsequent rotation, repeats through successive alternate disk rotations, until all of the concentric servo tracks 15 have been formed on the disk 1.

This system of jogging the laser beam during alternate rotations requires a mechanical arrangement to move the laser beam or relevant components of the beam optics. The jogging mechanism may be mechanically complex, and it takes time to jog the beam to the next active spot 3. One disadvantage is that two rotations are needed for each recording pass, one pass for the actual servo track recording and one pass to jog the beam to the new position before the start of recording of the next servo track. Consequently, the formation of the desired servo patterns takes an excessive amount of time. A second disadvantage of existing systems of this type is that the translation mechanism, to jog the beam, does not allow for micro-stepping of the beam, hence, the equipment imposes a limit on the possible spacing between the circular servo patterns.

An alternate approach, developed for use with an electron beam (although equally applicable to a laser beam) and using movement of the turntable, produces a spiral or helical pattern, not a pattern of concentric circles. FIG. 11 shows the translation in such a system, and FIG. 12 shows the resulting spiral servo pattern. Again, during processing, the disk rests on a turntable (not separately visible in the illustrated orientation). In this case, however, the beam remains stationary at spot 5. In the example, the turntable rotates in the direction indicated by the arrow B (although it could also rotate in the opposite direction), but here, the turntable also moves laterally in the direction of translation represented by the arrow T. With such disk translation, at the start of processing, the disk will be in the position represented by the circle 7. As the turntable moves the disk in the translation direction T, the disk moves until it approaches and reaches it's ending position, as represented by the circle 9.

Throughout the process, the turntable continuously rotates and translates the disk under the stationary electron beam at spot 5. The electron beam approach does not require interruption to step the translation. Also, this technique can produce smaller variations in the translation and thus smaller spacings between turns of the continuous servo pattern. However, the continuous rotation and translation results in recorded spirals 13 on the disk 11, essentially winding from a start point near the periphery of the disk to a point near a central opening 17, as shown in FIG. 12. As noted above, servo patterns on magnetic disks require concentric circles 15 (see FIG. 10). Hence a need exists for a technique to adapt the continuous translation approach (with the stationary beam) to produce a concentric circular pattern 15 required for servo regions of a magnetic disk for a hard disk drive or the like.

SUMMARY OF THE INVENTION

The concepts disclosed herein alleviate the above noted problems with using a stationary beam in combination with continuous disk rotation and translation to produce servo patterns, by providing an appropriate beam deflection to convert the pattern produced on the disk into a circle or a series of concentric circles.

In one example, a methodology provides at least one circular servo pattern on a disk recording medium, such as might be used in a hard disk drive or the like. The method involves modulating an exposure beam in accord with a pattern of servo regions to be formed on the disk while simultaneously rotating and translating the disk, relative to the modulated exposure beam. During a rotation of the disk, the method involves deflecting the exposure beam to maintain a circular track on the translating disk.

Essentially, the deflection equals the difference between the spiral track that the beam would expose if stationary and the desired concentric track. In the disclosed examples, a cyclical deflecting of the beam starts from an originating level of deflection, at the start of each respective rotation, and increases by an amount of deflection substantially equal to one track pitch by the end of the respective rotation.

The cyclical deflecting of the beam during each of the successive rotation starts from an originating level of deflection, at the start of the respective rotation, and increases by an amount of deflection substantially equal to one track pitch by the end of the respective rotation. It may be that there is some deflection constant, in which case, deflection may provide a constant offset value; and during each cycle/rotation, deflection would increase from that offset. In the examples, the deflection starts at zero, that is to say so that the beam is applied at a point on the disk corresponding to no deflection. The increase in deflection during each rotation corresponds to the deflection needed to convert the spiral pattern to the desired circular pattern. At any given degree of rotation, the deflection corresponds to (e.g. equal in magnitude but opposite to) the degree that the normal spiral pattern differs from concentric. At the end of each rotation, the turntable has translated the disk linearly by an amount substantially equal to one track pitch (±15%), hence, the deflection at that point compensates by an amount equal to one track pitch, to bring the path back into circular alignment.

Although the processing may utilize other types of deflectable exposure beams, the examples utilize electron beam recording equipment. A voltage signal applied to the deflection plates within the electron beam column deflect the beam output by an amount proportional to the instantaneous voltage. In the examples, the deflection voltage signal has a saw-tooth waveform, having a cycle corresponding to the period of revolution of the disk by the turntable.

Embodiments are disclosed using several different techniques for triggering the saw-tooth type ramp signal. For example, the flyback of the saw-tooth signal may be triggered in response to a rotational index signal, such as might be generated from detecting an index mark or feature on the turntable or on the disk. In another example, the flyback of the deflection signal may be triggered in response to pulses in the format modulation signal otherwise used to modulate the beam for control of the exposure. Preferably, the flyback occurs during an interval of the modulation in which the beam is not forming a servo pattern or mark on the disk, to avoid distortion of any of the servo marks.

An exemplary apparatus for implementing such a servo forming process includes an electron beam column and a turntable. The electron beam column generates a modulated electron beam, and the column includes deflection plates for controlling deflection of the modulated beam. The turntable provides both rotation of the disk and translation of the disk in a linear direction, relative to the modulated electron beam. The apparatus also includes a signal generator for supplying a deflection signal to the deflection plates of the electron beam column. The deflection signal from the signal generator produces a cyclical deflection sufficient to cause the apparatus to form servo patterns in concentric circles on the disk.

The foregoing and other features, aspects and advantages of the present invention will become more apparent from the following detailed description of the present invention when taken conjunction with the accompanying drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 4(a) and 4(b) are signal diagrams useful in explaining triggering of the ramp deflection signal generation in response to a turntable index or the like.

FIG. 10 is a top plan view of a disk and a prior art laser exposure beam device used to form concentric circular servo patterns on the disk.

FIG. 11 is a chart useful in explaining disk/turntable movement relative to a stationary beam, as implemented in a prior art electron beam recording system.

FIG. 12 is a top plan view of a disk showing the pattern of servo tracks formed using the stationary beam and disk movement technique of FIG. 11.

DETAILED DESCRIPTION OF THE INVENTION

The concepts disclosed herein address and solve problems related to providing concentric beam exposure patterns on a disk medium, for forming servo patterns or the like, using a beam source that otherwise would produce spiral patterns. These and other problems are solved, in part, by using a ramp signal or similar control signal, to deflect the beam during each successive disk rotation by an increasing amount that instantaneously corresponds to the deviation of the spiral pattern from concentric. During each successive rotation, the deflection of the beam results in generation of a circular pattern. After each rotation, the ramp and the resultant beam deflection return to a starting or originating level (zero in the examples), and the concentric track formation process repeats. As shown by the examples, it is possible to manipulate the beam in this manner during each successive rotation of the disk, without the delay of an additional rotation to jog the beam to a new position. Consequently, the approach eliminates delays and reduces the time to form complete sets of patterns on each disk yet still provides the desired concentric circular patterns. However, this approach still can produce relatively small spacings between concentric tracks.

Figure 1:
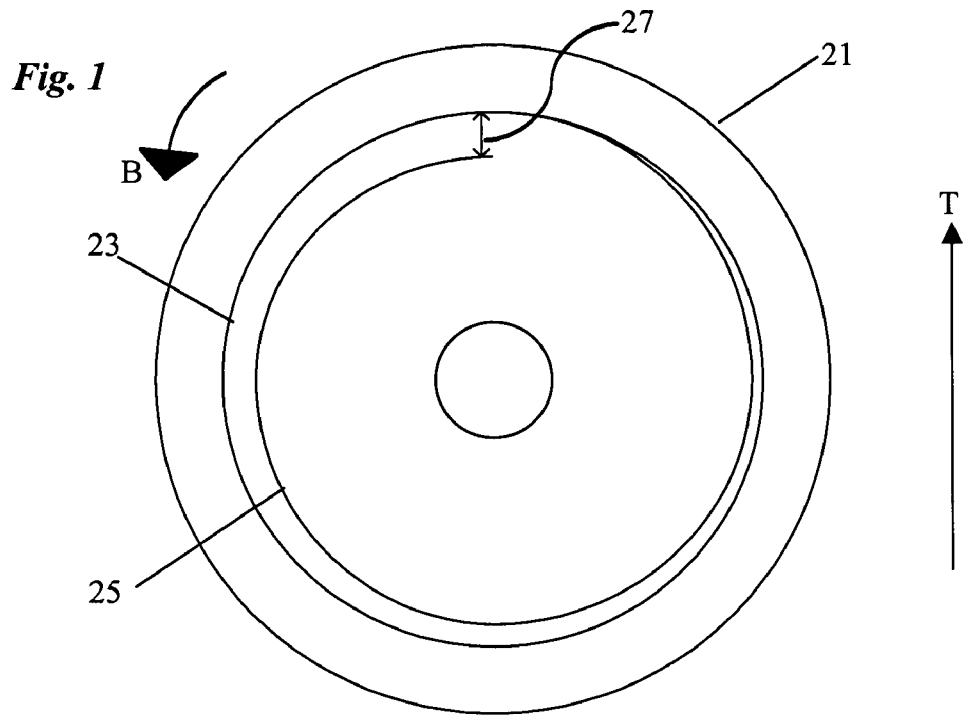
FIG. 1 is a top plan view of a disk showing formation of one circular servo pattern using a beam deflection to correct an otherwise spiral track.

Reference now is made in detail to the examples illustrated in the accompanying drawings and discussed below. FIG. 1 shows a disk 21 processed by an electron beam while rotated and translated on a moving turntable, where the beam deflection is controlled to produce a circular pattern 23. The drawing shows both the circular pattern 23 generated in one rotation of the disk and the spiral pattern 25 (corresponding to a portion of pattern 13) that would have been generated during that same rotation in the absence of the beam deflection.

As can be seen by comparing the tracks of the patterns 23 and 25, at the start of the rotation, the tracks coincide, and no deflection is necessary. However, at the end of rotation, the separation in the circular track 23 and the spiral track 25 is equal to one track pitch 27, that is to say the distance desired between concentric circles in the circular servo pattern. The underlying turntable has translated the disk a linear distance in direction T that is equal to one track pitch, during the one cycle of disk rotation. To convert the spiral pattern 25 to the desired circular pattern 23, the deflection of the beam increases from it origin (0 in this example), at the start of the rotation, up to an amount equal to the track pitch 27 at the end of the rotation. In the period between start and end of the rotation, the deflection increases; and at any given point the amount or level of deflection compensates for the offset between the spiral 25 and the desired circular track 25. Stated another way, the deflection is equal and opposite the difference between the spiral and concentric tracks. In the examples, the increase in deflection during each successive rotation (and each corresponding cycle of the deflection signal) is linear.

Without deflection, or with a constant deflection throughout a rotation, the beam would remain stationary, as in the example described in relation to FIGS. 11 and 12. In the illustrated example, the start of each track is at the twelve o'clock position. The beam could have a set deflection at the start point, for example, if there was a DC offset voltage applied to the beam deflection plates. For discussion purposes, however, it will be assumed that there is no DC offset, and the deflection at the start of each rotation is 0. The processing therefore deflects the beam by an amount starting at an amplitude of 0 at the twelve o'clock rotational position and increases linearly (ramping up) over one disk revolution to a value, which deflects the beam a distance equal to the track pitch 27. During the same rotation, the turntable moves (translates) the disk linearly in direction T by a distance equal to the track pitch 27. The deflection compensates for the translation, to convert the track of the beam exposure on the surface of the disk 21 from a spiral pattern 25 to a circular pattern 23.

Figure 2:
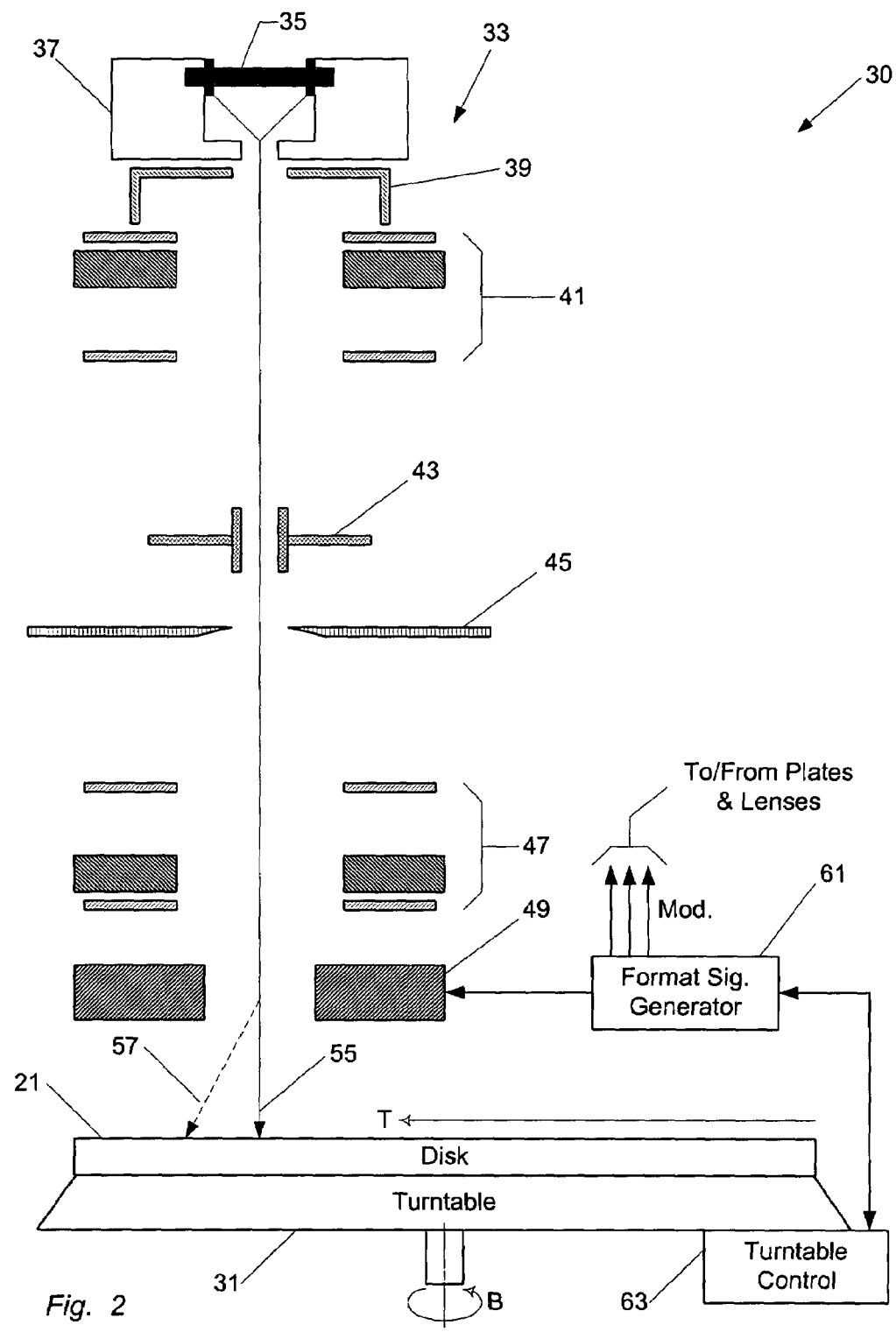
FIG. 2 is a side view of an electron beam disk recorder system for forming circular patterns on the disk, with the elements of the electron beam device (column) shown in cross-section.

FIG. 2 depicts an exemplary electron beam recording system 30. The system 30 includes a turntable 31 and an electron beam column 33 for generating and manipulating the recording beam. The turntable 31 supports the disk 21 for rotation in the direction B about its vertical axis, and for lateral translation in the direction T, beneath the beam emitted by the column 33. Examples of such an electron beam recording system are available from Unaxis Nimbus Limited. It is assumed that those skilled in the art are generally familiar with the structure and operation of available electron beam column devices, however, for completeness of the discussion, a summary description thereof is provided.

In the example, the electron beam column 33 includes a thermal field emission (TFE) electron source 35 and a suppression assembly 37. The column may also include electron extractor 39. When appropriate voltages are applied to the TFE source 35, the suppression assembly 37 and the extractor 39, these elements cooperate to generate a stream of electrons for further processing in the column 33. The stream of electrons passes through a first triple element lens 41, then through blanking plates 43 and a blanking aperture 45. The stream of electrons then passes through one or more additional lenses, represented for example, by the second triple lens 47 in the drawing.

The shapes of and voltages applied to the column elements serve to focus and shape the stream of electrons into an electron beam of a desired shape and having a desired energy level for a particular application, for example, for forming servo patterns of particular size and depth in the surface of the disk 21. The drawing in FIG. 2 shows the beam traveling through the column 33 as a straight line, for convenience of illustration. In actual operation, the beam would converge and diverge as it passes through the various elements of the column 33, in order to focus on a sample on the turntable 31 in a desired manner.

Of note for purposes of the present subject matter, the beam position is controlled by application of a voltage to the deflection plates 49. Without deflection, for example, at the start of a disk rotation, the beam travels in a perpendicular fashion as shown at 55, from the e-beam column 33 to the resist surface on the disk 21. Applying a deflection voltage to the plates 49 causes deflection of the beam. The polarity of the voltage determines the direction of the deflection. The amplitude of the voltage controls the magnitude of angular deflection of the beam and thus the linear displacement of the beam at a given distance from the column, for example, at the distance to the resist layer on the surface of the disk 21. A deflected beam output is represented by the dotted line 57 in FIG. 2. Typically, the angle and thus the linear displacement are proportional to the voltage applied across the plates 49. A DC voltage will produce a constant deflection, and a variable voltage produces a proportionally varying angle of deflection of the beam.

Hence, with deflection, the beam travels at an angle as shown at 57, and the angle (and thus the linear offset on the surface of the disk 21) is responsive to the voltage across the two plates 49. In the illustrated disk processing application, the direction of deflection is along a radius of the disk, which is in the cross track direction with respect to features recorded in a spiral or concentric pattern on the disk 21. The deflection direction coincides with the direction of disk travel. For example, if the translation T is upward in the orientation depicted in FIG. 1, at the end of each rotation (maximum deflection), the deflection must effectively move the beam from the tail of the spiral track 25 (where it otherwise would appear without deflection) upward to the desired point on the circular track 23. In this manner, the beam deflection compensates for the lateral translation of the disk 21 by the turntable 31, to keep the actual beam pattern on the disk circular.

By applying a ramped voltage during one rotation, a spiral pattern can be deflected into a concentric one. Throughout each successive rotation, the amplitude of the ramp and the attendant increase in magnitude of the deflection is proportional to the spiral's deviation from concentricity. Hence, the ramp signal applied to the plates 49 cyclically deflects the electron beam during the successive rotations of the disk. The cyclical deflection during each respective rotation of the disk starts from an originating level of deflection at the start of the respective rotation (0 in the example), and the ramp driven deflection increases linearly during each rotation by an amount substantially equal to one track pitch by the end of the respective rotation.

Figure 3:
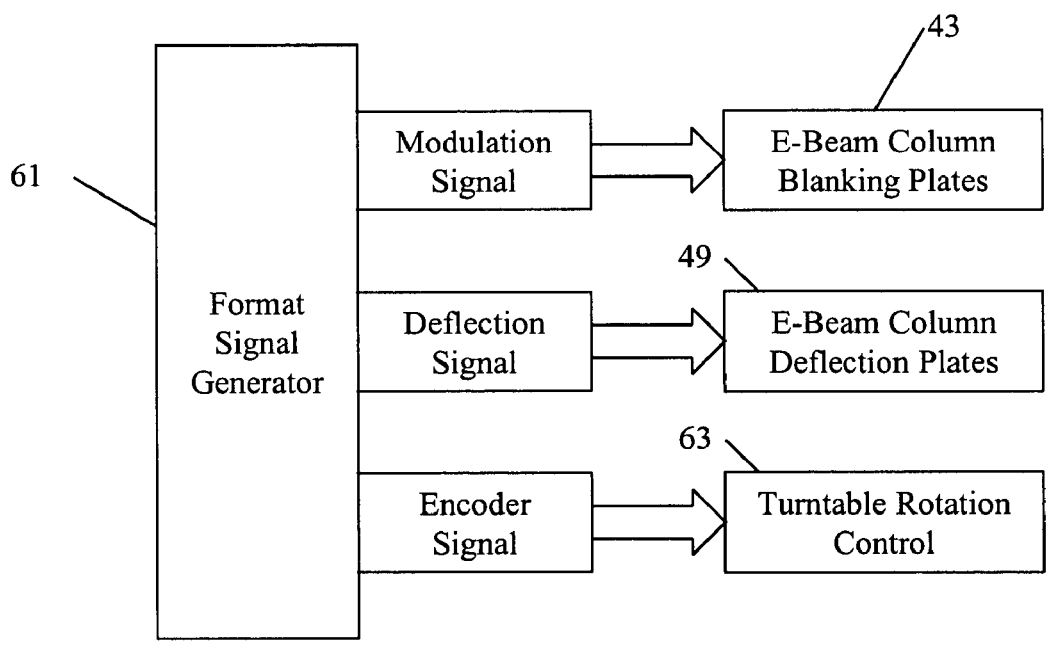
FIG. 3 is a signal flow diagram useful in explaining the control of the electron beam column and the turntable in the electron beam recording system of FIG. 2.

The electron beam recording system 30 also includes a format signal generator 61, for generating various signals used by the electron beam column 33 to modulate the beam and thus format the patterns being exposed on the disk 21. The formatter 61 essentially comprises circuitry forming one or more signal generators, for producing the various signals applied to the components of the column 30 to produce the desired beam. FIG. 3 is a signal flow diagram illustrating some aspects of the function of the format signal generator.

As shown in FIGS. 2 and 3, one example of a signal produced by the generator is the format modulation signal (or beam "format" signal) for application to the blanking plates, which controls the energy level of the electron beam and thus the exposure of the recorded pattern. A control 63 controls the rotational speed and possibly the translational movement of the turntable 31. The format signal generator 61 provides an encoder signal to the turntable control 63, to regulate the rotational operations of the turntable 31, and the control 63 may provide one or more feedback signals to the generator 61 indicating turntable position and/or speeds. For example, the turntable control may provide an index signal each time a mark or feature on the turntable or disk passes a reference point. The angle between rotation start point (e.g. 12 o'clock) and the reference point is a known constant. Hence, the index can be used to determine start and end points of successive rotations.

The format signal generator 61 also provides the voltage to the deflection plates 49. For purposes of the present discussion, the format signal generator 61 is programmed to produce a repeating saw-tooth signal having a linear ramp of the desired angle and amplitude, in synchronism with the rotation of the turntable 31. The timing of the flyback of the saw-tooth waveform is such that it occurs during a period of no exposure, for example, during a period when the beam would not otherwise be writing a servo feature on the disk 21, to avoid distortion of an exposed servo mark.

As shown by the above discussion, the ramp type deflection signal should be synchronized with the rotation of the disk 21. Those skilled in the art will recognize that there are a number of ways to achieve this synchronization. Examples are discussed below that achieve synchronization by triggering the ramp signal for the deflection in response to a rotational index signal and in response to a predetermined feature or pulse in the format modulation signal.

Figure 4A:
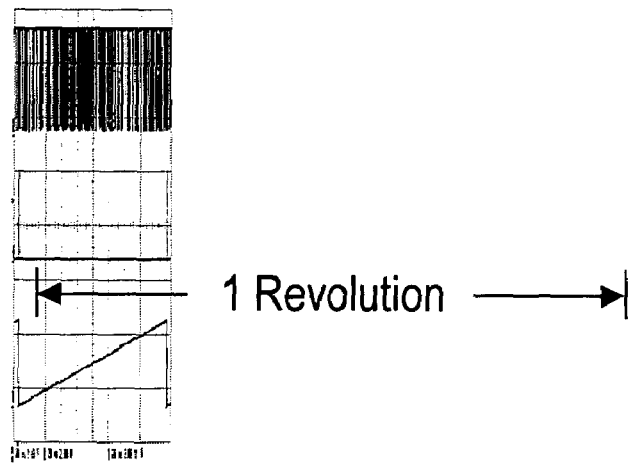
Figure 4B:
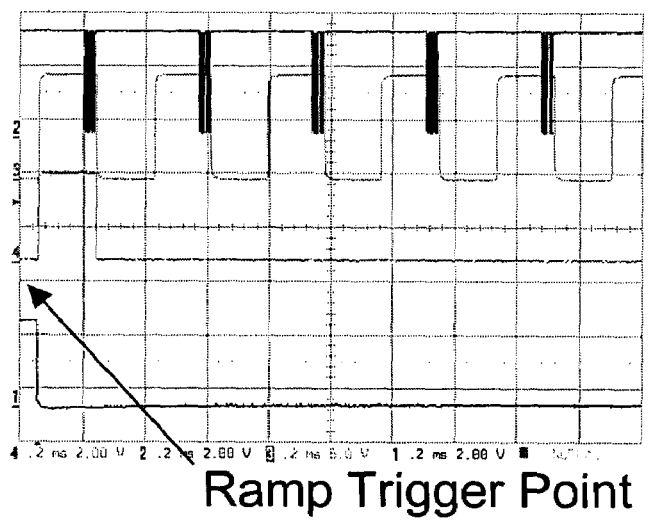

FIGS. 4(*a*) and 4(*b*) are signal diagrams representing triggering of the ramp signal (third line from the top) based on an index signal. FIG. 4(*a*) shows the format modulation signal, an index signal and the deflection signal, over a time period slightly longer than one revolution of the disk, and thus slightly longer than one cycle of the ramp deflection signal. FIG. 4(*b*) shows the format modulation signal, a sector signal, the index signal and the deflection signal, in an expanded form covering a shorter period of time including the flyback of the saw-tooth deflection signal.

The top line of FIG. 4(*a*) shows the format modulation signal, as applied to modulate the electron beam and thereby format the desired servo patterns on the disk. The second line represents a disk rotation index signal, which provides one pulse per revolution of the disk on the turntable. The index may be generated by the format signal generator 61 or may be generated in response to an index mark or other feature on the turntable (or the disk) detected by a sensor, as the disk and turntable rotate. For example, the turntable control 63 may include the sensor and provide the index signal as a form of feedback to the format signal generator 61 (FIG. 2). As shown by the third line in FIG. 4(*a*), the saw-tooth deflection signal begins in response to each index pulse and linearly ramps up between the index pulses, returning to zero (flying back) just prior to the next index pulse. As shown, the cycle of the deflection signal corresponds closely to one revolution of the disk and the turntable.

The expanded view of the signals in FIG. 4(*b*) shows the relationship of the ramp trigger to the other signals, in somewhat more detail. FIG. 4(*b*) also shows the sector pulses. As shown, the index coincides with one of the sector pulses, whereas the pulses in the format modulation signal coincide with the trailing edge of the sector pulses. The ramp signal is triggered on the leading edge of the index signal (coinciding with the leading edge of a sector signal pulse). The flyback of the ramp signal is complete before the next pulse in the format modulation signal and before the trailing edges of the sector and index pulses. As shown, during the flyback interval, the format modulation signal is not driving the beam to write any servo pattern to the disk; hence, the flyback of the beam does not produce any marking of the disk 21. This arrangement of the ramp's flyback during a period of no exposure avoids distortion of a servo mark by the beam translation during flyback.

Figure 5A:
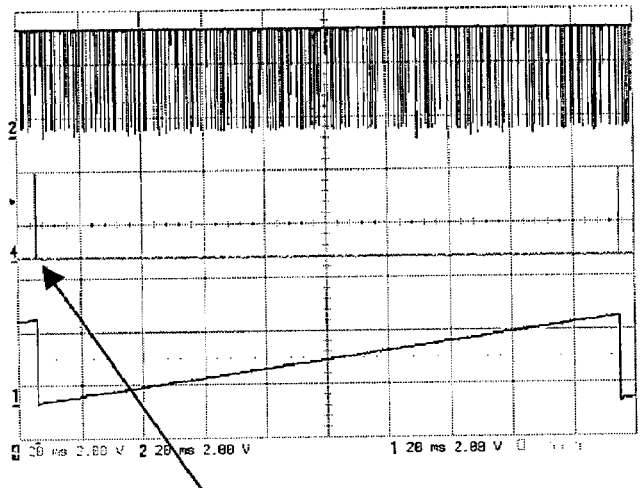
FIGS. 5(a) and 5(b) are signal diagrams useful in explaining triggering of the ramp deflection signal generation in response to the format modulation.
Figure 5B:
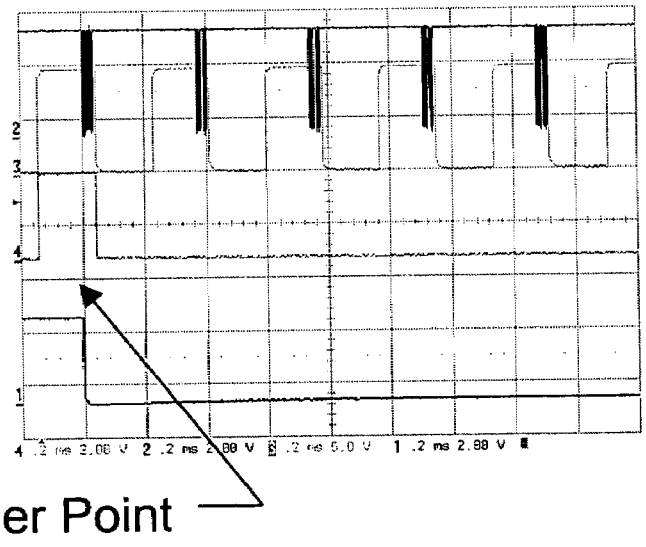

FIGS. 5(*a*) and 5(*b*) are signal diagrams representing triggering of the ramp signal (third line from the top) based on a pulse in the format modulation signal. FIG. 5(*a*) shows the format modulation signal, an index signal and the deflection signal, over a time period slightly longer than one revolution of the disk, and thus slightly longer than one cycle of the ramp deflection signal. FIG. 5(*b*) shows the format modulation signal, a sector signal, the index signal and the deflection signal, in an expanded form covering a shorter period of time including the deflection signal flyback. The index signal is not used in this embodiment, but it is shown here to facilitate appreciation of the distinctions between the two different triggering techniques.

The top line of the FIG. 5(*a*) shows the format modulation signal, as applied to modulate the electron beam and thereby format the desired servo patterns on the disk. The second line shows disk rotation index signal. As shown by the third line, the ramp deflection signal is triggered in response to a pulse, in this case, a pulse within the format modulation signal. Upon triggering, the deflection signal linearly ramps up between the particular pulses in the format modulation signal used as triggers, returning to zero (flying back) just prior to the next format modulation signal used as a trigger. Again, the cycle of the ramp deflection signal corresponds closely to one revolution of the disk and the turntable, and thus to one complete cycle of the format modulation signal.

The very first modulation pulse output by the format signal generator triggers the first sawtooth ramp. The length of the ramp is chosen to be slightly less than one rotation of the disk, and the ramp generator will not retrigger until it has finished outputting the ramp. Therefore, as long as sufficient time exists between the last modulation pulse of one rotation and the first modulation pulse of the next rotation for the ramp generator to finish outputting the ramp and reset, then it will always trigger off of the first modulation pulse of each rotation.

The expanded view of the signals in FIG. 5(*b*) shows the relationship of the ramp trigger to the other signals, in somewhat more detail. As shown, the pulse signal within the format modulation stream occurs somewhat late in the period of the high-pulse of the sector signal (and similar pulse in the index signal). Each set of modulation pulses in the format signal extends to a trailing edge of one of the respective sector pulse. In this example, the ramp signal is triggered on the first pulse in one of the format modulation pulse sets.

Figure 6:
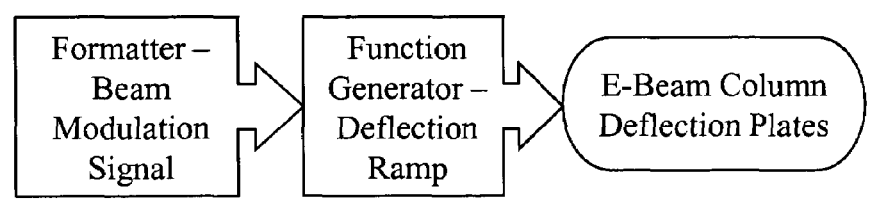
FIGS. 6 and 7 are flow-charts illustrating alternative logic useful in generating the beam deflection.

FIG. 6 is a logical flow diagram of one procedure for generating the ramp signal. As shown, the formatter generates the beam modulation signal, in the normal manner. A function generator (or program logic in the formatter) is responsive to the modulation signal for generating the ramp signal, for example, in response to predetermined pulses in the modulation signal as in FIGS. 5(a) and 5(b). The resulting saw-tooth ramp signal serves as the deflection signal applied to the deflection plates in the electron beam column (see FIG. 2). Again, it is preferable that the beam flyback occur during a period of no exposure, so as to avoid distortion of a servo mark.

Figure 7:
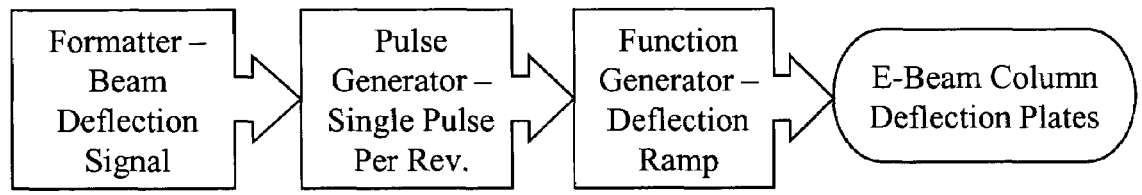

FIG. 7 is a logical flow diagram of another procedure for generating the ramp signal. As shown, the formatter generates it's own internal deflection signal, in addition to the beam modulation signal, in the normal manner. Here, logic is provided (as a separate circuit or more likely as program logic in the formatter) to generate one pulse per revolution from processing of the internal deflection signal. The one pulse per revolution signal is analogous to the index signal used in the embodiment of FIGS. 4(a) and 4(b), except that here it is produced from the internal deflection format signal. In response to the one-pulse-per-revolution signal, the system generates the saw-tooth ramp signal. The resulting ramp signal serves as the deflection signal applied to the deflection plates in the electron beam column (see FIG. 2).

Figure 8A:
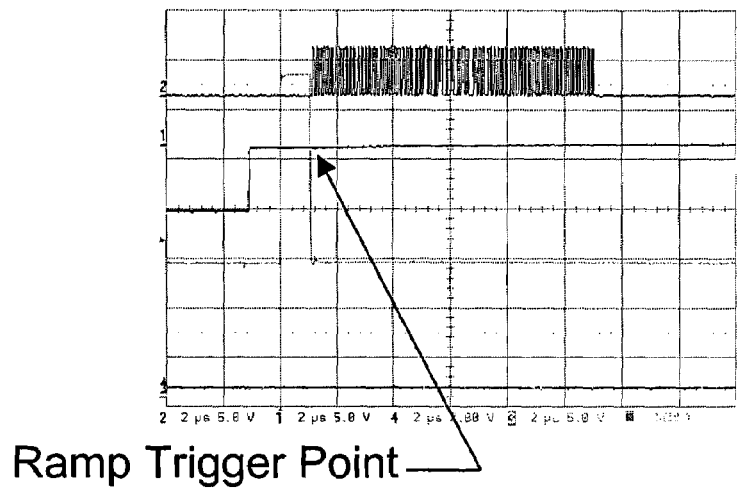
FIGS. 8(a) and 8(b) are additional signal diagrams useful in explaining generation of the deflection ramp signal.
Figure 8B:
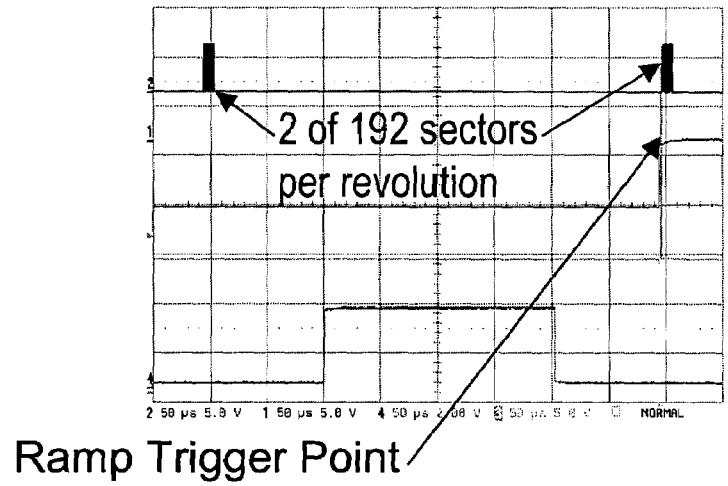

FIGS. 8a 8b show the signals represented in FIG. 7 in condensed and expanded view. Although the formatter provides an internal deflection signal, it does not provide a means to adjust its timing relative to the modulation signal. In FIG. 7, the internal deflection signal triggers the single pulse, the trailing edge of which is used to trigger the external deflection signal. By adjusting the length of the single pulse, the timing of the external deflection signal can be adjusted relative to the modulation signal. This allows the flyback to be placed away from the modulation signal, avoiding distortion of the exposed mark. The external deflection signal is depicted in FIGS. 8a and 8b.

Figure 9A:
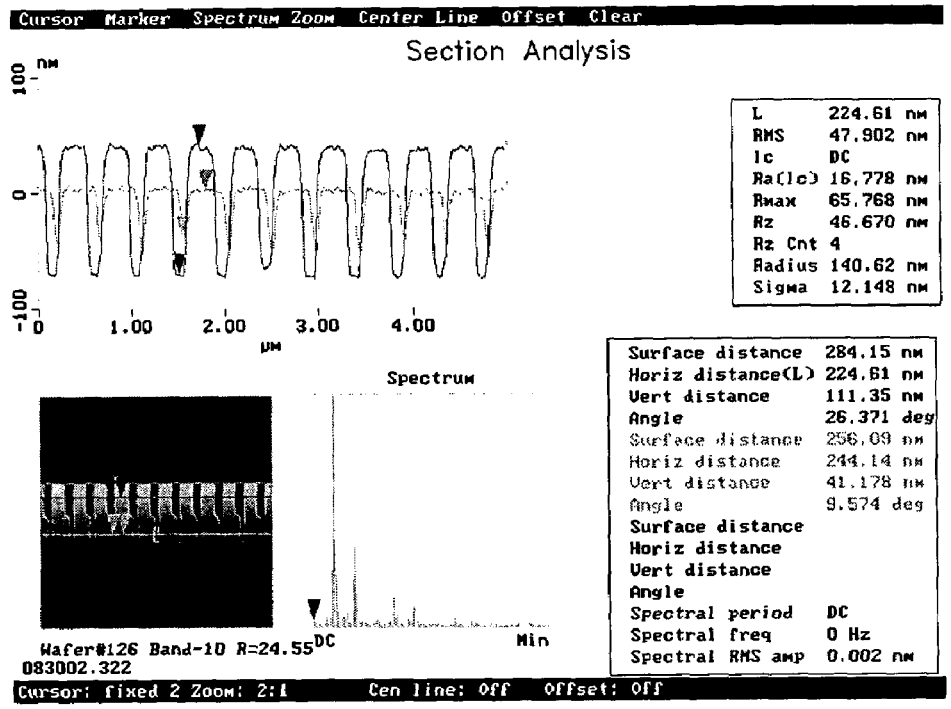
FIG. 9(a) and 9(b) illustrate results of disk processing, where 9(a) presents data for processing without beam deflection, and 9(b) presents data for processing with ramp-driven beam deflection.
Figure 9B:
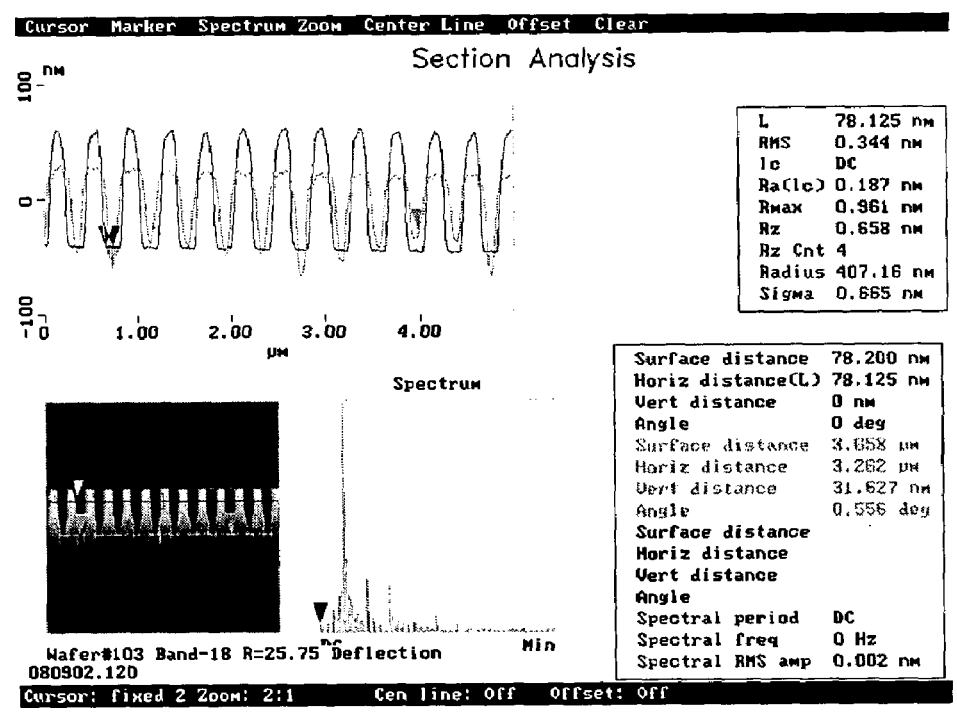

FIGS. 9a and 9b illustrate the results obtained with and without deflection correction applied. FIG. 9a is an AFM (Atomic Force Microscope) image of a groove written as a spiral, without deflection correction. The length of the groove is slightly longer than one rotation of the disk, causing a doubly exposed region where the ends of the groove overlap. Because no correction has been applied, the two ends of the groove are not centered on each other. Therefore, the groove is not a perfect circle. FIG. 9b is an image of a groove written as a spiral, with deflection correction applied. In contrast to 9a, the two ends of the groove are centered on each other, forming the circular pattern desired.

Although the present subject matter has been described and illustrated in detail, it is to be clearly understood that the same is by way of illustration and example only and is not to be taken by way of limitation, the scope of the claims being limited only by the terms of the appended claims.

What is claimed is:

1. An electron beam recording system for forming concentric circular servo patterns on a substrate disk, comprising:
   an electron beam column for generating a modulated electron beam responsive to a format modulation signal, the electron beam column including deflection plates for controlling deflection of the modulated electron beam in response to a deflection signal;
   a turntable, for rotating the substrate disk and simultaneously translating the substrate disk, to move the substrate disk relative to the electron beam, while applying the electron beam to a surface of the substrate during a plurality of successive rotations of the substrate disk; and
   a signal generator for supplying the deflection signal to the deflection plates of the electron beam column, wherein:
      the deflection signal from the signal generator comprises a cyclical increasing ramp signal for producing a cyclical deflection of the modulated electron beam,
      cycles of the ramp signal substantially correspond to rotations of the substrate disk by the turntable,
      the format modulation signal comprises a set of pulses during each rotation of the substrate disk by the turntable,
      during each respective rotation of the substrate disk, the signal generator starts increasing of the ramp signal from a first level in response to the first one of the pulses of the set during the respective rotation and returns the ramp signal from a second level to the first level at a time prior to completion of the respective rotation, and
      the increase from the first level to the second level provides an increase in deflection of the electron beam substantially equal to one track pitch during each cycle of the ramp signal, so as to cause the system to form patterns of servo features in concentric circles on the substrate disk during successive rotations of the substrate disk on the turntable.

2. The system of claim 1, wherein, during each cycle of the ramp signal, the signal generator is configured to return the ramp signal from the second level to the first level during an interval in which modulation of the electron beam produces no pattern on the substrate disk.

3. The system of claim 1, wherein the turntable translates the substrate disk linearly by an amount equal to one track pitch during each respective rotation of the substrate disk.

4. The system of claim 1, wherein:
   the first level of the ramp signal produces zero beam deflection, and
   the second level of the ramp signal produces a deflection substantially equal to one track pitch in a direction corresponding to the translation of the substrate disk by the turntable.

5. The system of claim 1, wherein the signal generator is configured to generate the ramp signal in the form of a sawtooth signal.

6. A method of forming a servo pattern on a substrate disk, comprising:
   modulating an exposure beam in response to a format modulation signal representing a desired pattern of servo regions to be formed on the substrate disk;
   rotating the substrate disk and simultaneously translating the substrate disk, to move the substrate disk relative to the modulated exposure beam, while applying the modulated exposure beam to a surface of the substrate during a plurality of successive rotations of the substrate disk;
   the format modulation signal comprising a set of pulses during each rotation of the substrate disk;

cyclically, during each respective rotation of the substrate disk, generating an increasing ramp signal, wherein the generating of the increasing ramp signal comprises:
(a) starting the increasing of the ramp signal from a first level, in response to the first one of the pulses of the set during the respective rotation, and
(b) returning the ramp signal from a second level to the first level at a time prior to completion of the respective rotation,
deflecting the modulated exposure beam during the rotation of the substrate disk in accord with the cyclical ramp signal during the respective rotations of the substrate disk,
wherein the increase from the first level to the second level provides an increase in deflection of the modulated exposure beam substantially equal to one track pitch during each cycle of the ramp signal, so that the modulated exposure beam forms servo patterns in concentric circles on the substrate disk during the successive rotations of the substrate disk.

7. The method of claim 6, wherein:
the exposure beam comprises an electron beam, and
the ramp signal comprises a deflection voltage signal for application to deflection plates of an electron beam generation device producing the electron beam, to control deflection of the electron beam.

8. The method of claim 6, wherein the ramp signal has a sawtooth waveform.

9. The method of claim 6, wherein during each respective rotation of the substrate disk, the return of the ramp signal from the second level to the first level is performed during an interval in which the modulating of the exposure beam produces no pattern on the substrate disk.

10. The method of claim 6, wherein:
the deflection of the exposure beam in response to the first level of the ramp signal, at a start of each rotation, is substantially zero, and
the deflection of the exposure beam in response to the second level of the ramp signal is substantially equal to a track pitch in a direction corresponding to the translation of the substrate disk.

11. The method of claim 10, wherein the substrate disk is translated by a distance equal to one track pitch during each successive rotation.

* * * * *